United States Patent [19]

Rudolf

[11] Patent Number: 5,209,341
[45] Date of Patent: May 11, 1993

[54] TRANSFER DEVICE IN A PRESS

[75] Inventor: Lüthi Rudolf, Niederwangen, Switzerland

[73] Assignee: Styner & Bienz AG, Neiderwangen, Switzerland

[21] Appl. No.: 834,346

[22] Filed: Feb. 12, 1992

[30] Foreign Application Priority Data

Mar. 15, 1991 [CH] Switzerland ............ 00792/91

[51] Int. Cl.⁵ .............................................. B65G 25/00
[52] U.S. Cl. ...................................... 198/621; 198/776
[58] Field of Search ............ 198/621, 468.8, 775, 198/776, 774.4

[56] References Cited

U.S. PATENT DOCUMENTS

| 3,077,259 | 2/1963 | Braun . | |
| 4,540,087 | 9/1985 | Mizumoto | 198/621 |
| 4,627,528 | 12/1986 | Mikusch et al. | 198/621 |
| 4,727,976 | 3/1988 | Tsuchiya et al. | 198/468.6 X |
| 4,735,303 | 4/1988 | Wallis | 198/621 |
| 4,887,446 | 12/1989 | Maher | 198/621 X |
| 4,895,013 | 1/1990 | Sofy | 198/621 X |
| 5,074,141 | 12/1991 | Takeuchi | 198/621 X |

FOREIGN PATENT DOCUMENTS

| 3329900 | 2/1984 | Fed. Rep. of Germany . | |
| 2332125 | 6/1977 | France . | |
| 477075 | 10/1975 | U.S.S.R. | 198/774.4 |

Primary Examiner—D. Glenn Dayoan
Attorney, Agent, or Firm—Marks & Murase

[57] ABSTRACT

Workpieces are transported step-by-step by of transport bars which are provided with grippers and which are longitudinally, transversally and vertically displaceable. In addition to their transversal movement in the horizontal direction, the transport bars perform a slightly inclined movement in the longitudinal direction, in such a manner that the respective workpieces enter the next tool station in a lifted position. Without a special vertical drive for the transport bars, a safe transfer is obtained without the risk that workpieces collide with parts of the tool stations.

12 Claims, 4 Drawing Sheets

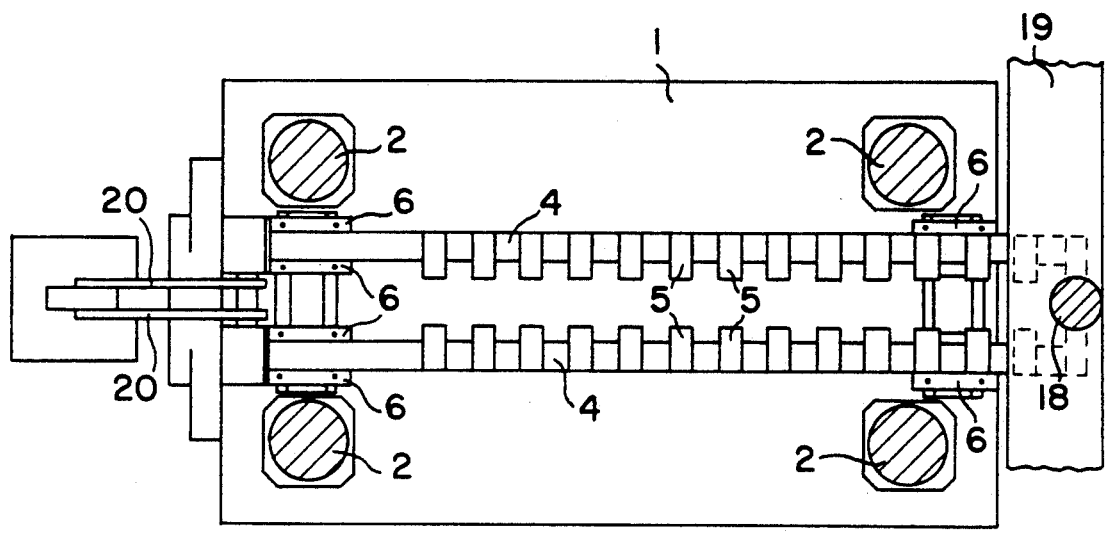
FIG. 1
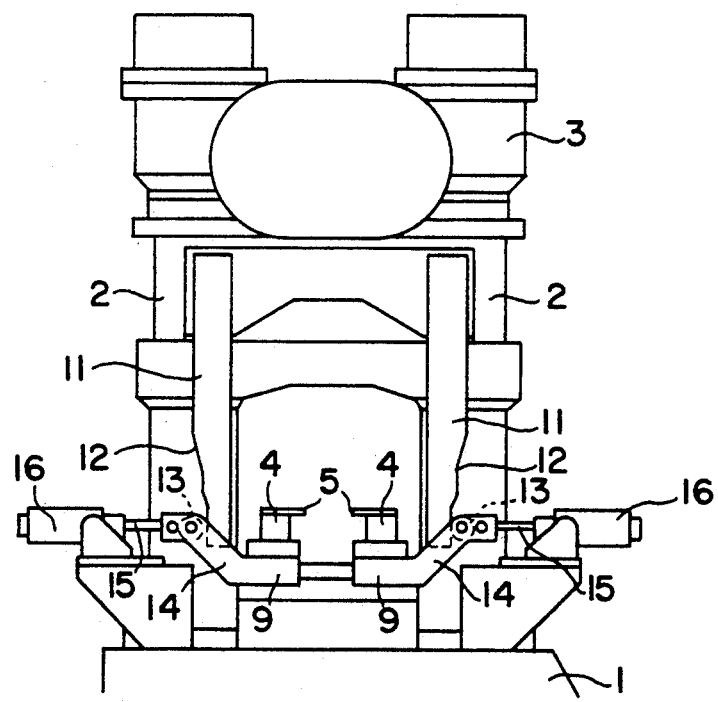
FIG. 2
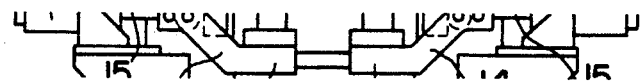

TRANSFER DEVICE IN A PRESS

BACKGROUND OF THE INVENTION

The present invention refers to a transfer device in a press, for the stepwise transport of workpieces through the processing stations of a tool, comprising transport bars which are disposed laterally with respect to said tool and which are provided with grippers for said workpieces and are displaceable longitudinally and transversally in a reciprocating, cyclic movement. In each working cycle, said transport bars perform a closed rectangular movement by advancing a number of seized workpieces to the following station of the tool in a first step, then being laterally retired from said tool, longitudinally returned, and moved towards said tool again in order to seize the workpieces. In the process, considerable accelerations and decelerations and correspondingly high forces of inertia will result, so that the working cadence of said press is limited by the rigidity and the stability of said transfer device. Relatively narrow limits are thus set since any increase of the rigitiy and of the mechanical deformation stability of the transport bars leads to an increase of weight which in turn results in an increase of the forces of inertia.

SUMMARY OF THE INVENTION

In order to ensure a disturbance-free transfer of the workpieces, an additional vertical movement is superimposed on the above-mentioned horizontal transfer movement, said transport bars and the grippers being lifted up a small distance each time after having seized the workpieces in order to allow a safe entry of the seized workpieces into the next station of said tool. Without this vertical movement, there is a risk that workpieces might collide with parts of the next station when entering the same.

It is the object of the present invention to simplify the transfer device considerably by giving the transport bars a slightly inclined movement. The vertical component of this movement can be comprised in a range of 0.1 to 1 mm, which is enough to prevent any collision between workpieces and parts of the tool.

In this context, it is particularly advantageous to provide a transfer device having a sufficient stability with a relatively modest weight, and thus allowing relatively high working cadences. It has been found that transport bars which are constrained at their ends and rigidly guided longitudinally and transversally are particularly stable with respect to deformations and thus can be subjected to comparatively higher accelerations. Hollow profiles, more particularly square hollow profiles, which have a high stability also in the vertical direction, are preferably used as transport bars.

BRIEF DESCRIPTION OF THE DRAWINGS

The invention is now explained in more detail with reference to an embodiment which is represented in the drawing.

FIG. 1 is a plan view of the press bed and the transfer device;

FIG. 2 is a front view of the press including parts of the transfer device;

DESCRIPTION OF THE PREFERRED EMBODIMENTS

Figure 3:
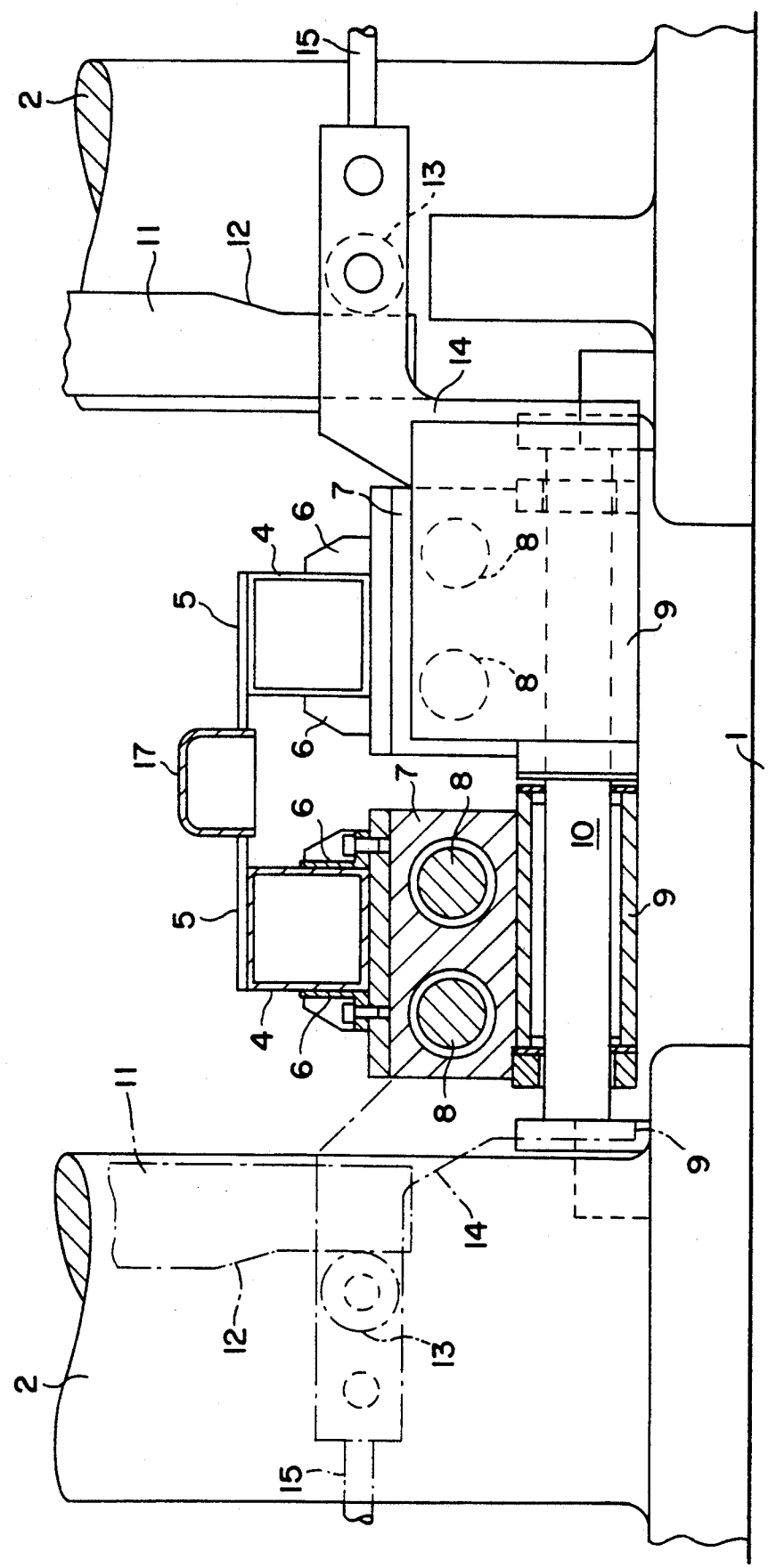
FIG. 3 is a partial section according to line III—III of FIG. 1 on an enlarged scale.
Figure 6:
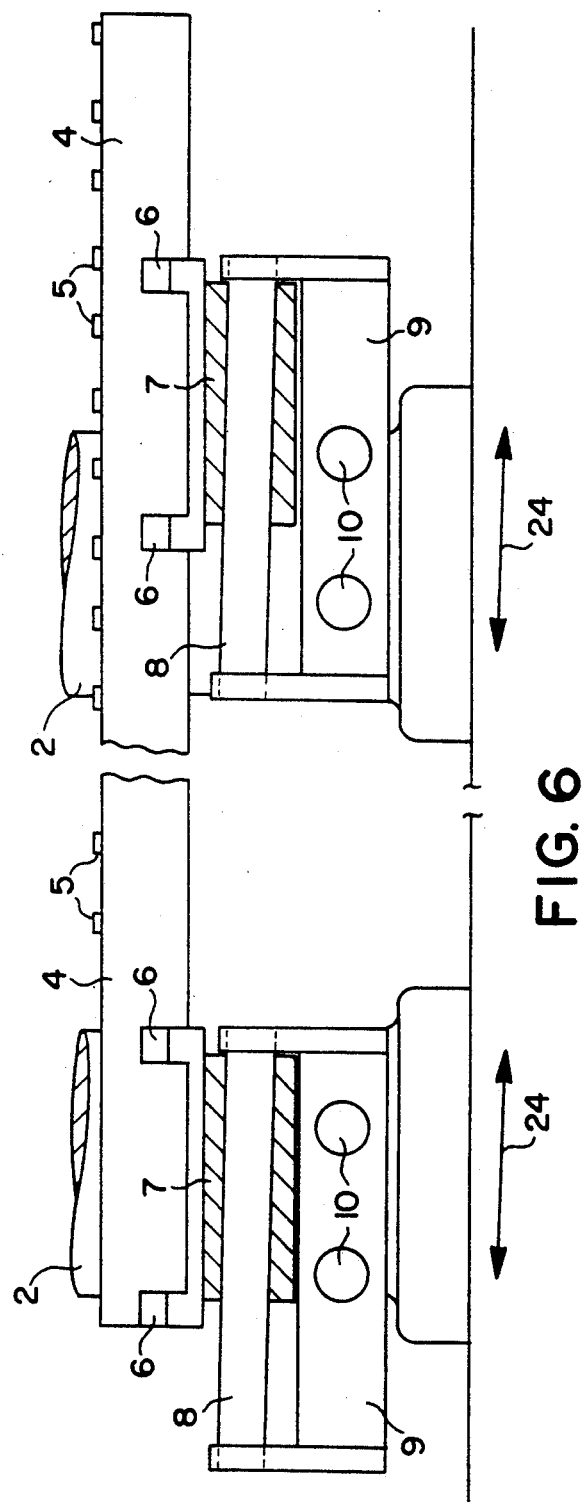
FIG. 6 shows the inclined guidings of the transport bars.

In a more or less schematical manner, FIGS. 1 and 2 show a press bed 1, guiding columns 2, and a press slide 3. As is common practice, the lower portion of a transfer tool comprising a plurality of processing stations is secured to the press bed 1, and the upper portion to slide 3. Said tool is not represented in FIGS. 1-4 and 6 for the sake of simplicity. On either side of said tool, a respective transport bar 4 having purely schematically illustrated grippers 5 for workpieces is provided. As shown particularly in FIG. 3, said transport bars 4 consist of square hollow profiles which with respect to their weight have a high bending and torsional rigidity. Grippers 5 are fitted on the upper side of transport bars 4, i.e. asymmetrically with respect to the profile of said bars, so that transport bars 4, as mentioned, are also subject to torsional stresses in operation. Between the guiding columns 2, i.e. at some distance outside said guiding columns in the longitudinal direction of transport bars 4, the ends of said transport bars are welded to angle brackets 6 which in turn are fixedly screwed to longitudinal slides 7. Said longitudinal slides 7 (FIG. 3) are fixedly guided along two parallel guiding bars 8 which are mounted in a transversal slide 9 which is guided along two parallel transversal guiding bars 10. The ends of transport bars 4 are thus rigidly constrained and guided, which, together with the high rigidity of the transport bars themselves, leads to a very high stability, i.e. to low deformations of the transport bars under the abovementioned forces of inertia. As a result, it is possible to work at comparatively very high working cadences of e.g. up to 300/min without prejudice to the safety in operation or to the lifetime of the guidings and the drive. As indicated in FIG. 6, guiding bars 8 are slightly inclined in such a manner that transport bars 4 perform a correspondingly inclined transport movement, which is indicated by arrows 24.

The transversal movement of the transport bars 4 is controlled by control rails 11 which are mounted on press slide 3 and which, by means of external control cams 12, act upon control rollers 13 of projections 14 on slides 9. The piston rods 15 of pneumatic cylinders 16 also act upon projections 14. A reliable, constant inward pressure is thus applied to projections 14, so that control rollers 13 are always safely pressed against control cams 12 of control rails 11. It appears in FIGS. 2 and 3 that during the downward movement of control rails 11 together with press slide 3, control rollers 13 and the parts which are connected thereto, i.e. also transport bars 4, are spread apart in such a manner that a workpiece 17 which is clamped between two opposite grippers 5 will be released. Meanwhile, grippers 5 are also laterally removed from the range of the two tool portions, so that the tool is allowed to close in all stations for the processing of workpieces. It is indicated in FIG. 1 that blanks 18 are cut from a transversally advancing strip 19 at a determined location and are received by the outermost grippers of transport bars 4.

Figure 4:
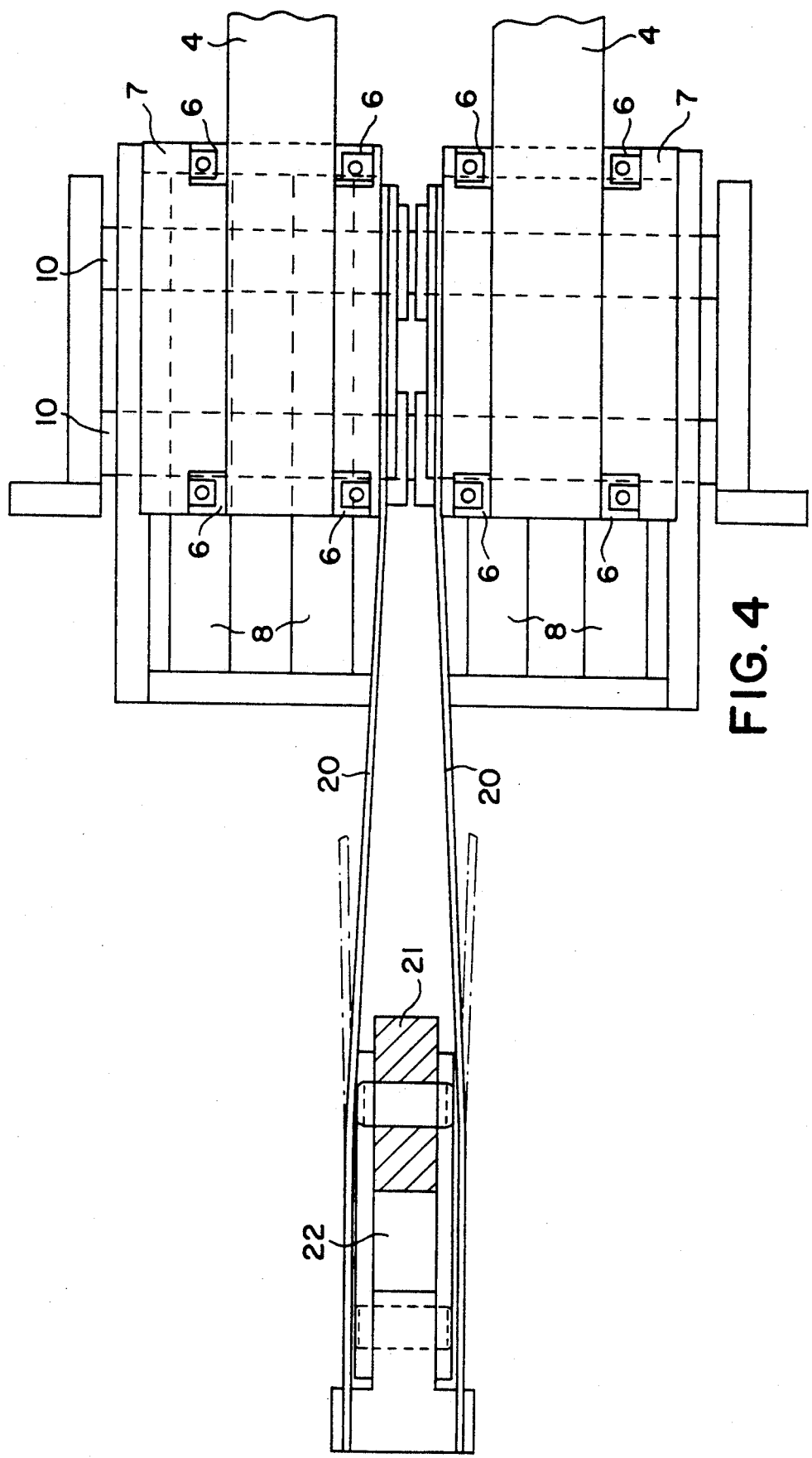
FIG. 4 shows a part of the drive of the transfer device.

The longitudinal advance of transport bars 4 is effected by means of two leaf springs 20 which are secured to the inner side of longitudinal slides 7 and are driven by a drive lever 21 via coupling lever 22. Leaf springs 20 are rigid enough to drive transport bars 4 in the longitudinal direction, but they are capable of following the transversal movements of transport bars 4, as is indicated in FIG. 4. It will be noted that the embodiment of the longitudinal drive according to FIG. 4 deviates somewhat from that which is illustrated purely schematically in FIG. 1.

As already mentioned, the two transport bars 4 perform very fast movements in the longitudinal and the tranversal directions in operation, considerable forces of inertia resulting in the bars during the transversal movements, which result in bending and torsional stresses of said bars. Due to the guiding of the bar ends, which is free of play and therefore rigid, said bar ends are substantially rigidly constrained, and are thus not exposed to any bending or pivotment in their mountings. It has been found that the bending of the transport bars is thus quite considerably reduced. Accordingly, considerably higher stresses, i.e. higher working cadences are possible under given requirements as to the precision of the respective positions of the workpiece grippers. On the other hand, the high rigidity of light-weight transport bars 4 contributes to an extraordinary rigidity of the entire arrangement, thus allowing high working cadences. Nevertheless, the forces of inertia are limited because the total weight of the moving parts is relatively low.

Figure 5:
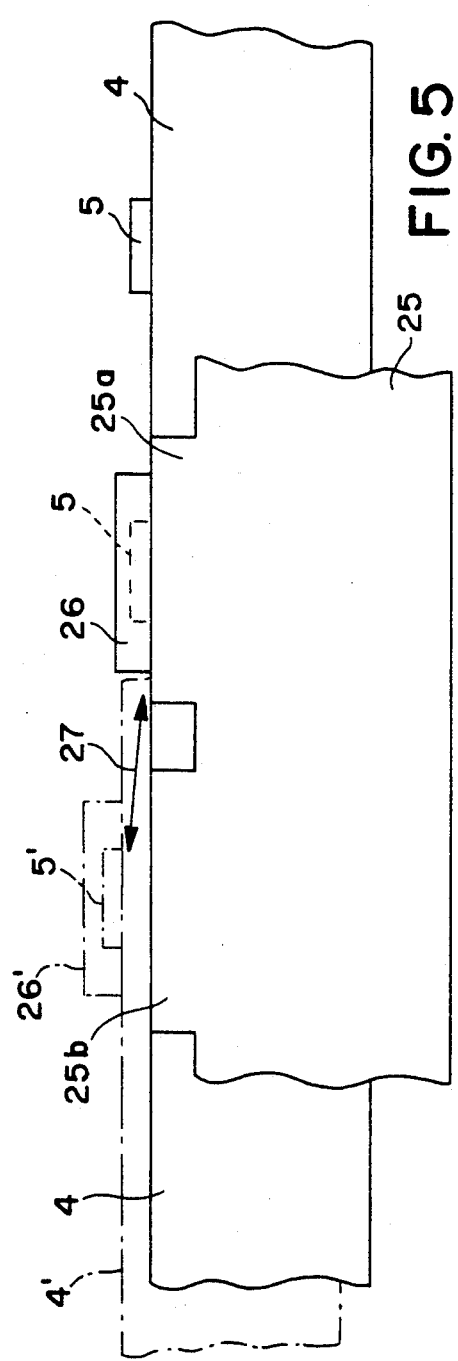
FIG. 5 schematically shows the transfer of a workpiece.

The transfer movement of the invention for a given workpiece is illustrated in FIG. 5. A section of the lower portion 25 of a tool with two processing stations 25a and 25b is schematically indicated. A gripper 5 of transport bar 4 seizes a workpiece 26 in station 25a and transfers it along the slightly inclined direction of arrow 27 to station 25b, into which said workpiece enters in a slightly lifted position. FIG. 5 shows the end positions of the transport bar (4'), of the workpiece (26'), and of the gripper (5'). There is no risk of a collision between the workpiece and parts of station 25b, which is also due to the high stability and the absence of resonances in the transfer system, said system allowing a precise control of all gripper movements, and particularly of the small vertical component of said movement as well. A special vertical drive for the transport bars is not required here. The drive of transport bars 4 by means of leaf springs 20 provides freedom of the bar movements in the horizontal as well as in the vertical direction.

I claim:

1. A transfer device for transporting a workpiece, said transfer device comprising:
    an outer frame;
    a plurality of processing stations within said outer frame and along a longitudinal axis through said transfer device, and
    inclined holding means for holding said workpiece in said transfer device as it moves through said processing stations, said holding means extending from a first side to a second side of said transfer device, wherein each of said processing stations comprises;
    a processing station frame with oppositely positioned first and second ends along said longitudinal axis;
    transport means for moving said workpiece from approximately said first end to approximately said second end of said processing station frame, said transport means slidably supporting said holding means;
    control means for controlling any lateral movements of said holding means, said control means being adjacent to and cooperating with said transport means; and
    a plurality of inclined guiding bars extending through said transport means and from said first end to said second end of said processing station frame which guide said transport means substantially continuously upwards as it moves from said first end to said second end of said processing station frame.

2. The transfer device of claim 1, wherein each of said plurality of guiding bars are parallel to one another.

3. The transfer device of claim 1, wherein said plurality of guiding bars are substantially straight.

4. The transfer device of claim 1, wherein said control means further comprises pressure means for applying a constant inward pressure to said transport means, said pressure means located adjacent to said transport means, a transversal slide member located directly below and adjacent to said transport means which cooperates with said pressure means and lateral guiding bars extending laterally across said processing station frame through said transversal slide member which longitudinally guide said transversal slide members.

5. The transfer device of claim 1, wherein said transfer device further comprises a drive means at said second side for moving said transport means from said first end to said second end of said processing station frame, said guide means being connected to said transport means.

6. An apparatus for transferring a workpiece comprising:
    an outer frame;
    a plurality of processing stations within said outer frame along a longitudinal axis through said apparatus,
    a pair of inclined transport bars passing through said processing stations and extending from a first side to a second side of said apparatus, and
    holding means for securing said workpiece on said transport bars, wherein each of said processing stations comprises;
    a processing station frame with oppositely positioned first and second ends along said longitudinal axis;
    transport means for moving said workpiece from approximately said first end to approximately said second end of said processing station frame and slideably supporting said transport bars;
    control means for controlling any lateral movements of said transport bars, said control means being adjacent to and cooperating with said transport means; and
    a plurality of inclined guiding bars extending through said transport means and from said first end to said second end of said processing station frame, whereby said transport means, said transport bars and said workpiece substantially continuously rise as they move from approximately said first end to approximately said second end of said processing station frame.

7. The apparatus of claim 6, wherein said apparatus further comprises drive means at said second side for moving said transport means from said first end to said second end of said processing station frame.

8. The transfer device of claim 6, wherein each of said transport bars is fixed to said transport means by a plurality of angle brackets.

9. The transfer device of claim 8, wherein said brackets are welded to said transport bars.

10. The transfer device of claim 8, wherein said brackets are fixedly screwed to said transport means.

11. The transfer device of claim 6, wherein said transport bar has a substantially square cross section and is hollow.

12. An apparatus for transferring a workpiece comprising:
    an outer frame;
    a plurality of processing stations within said outer frame along a longitudinal axis through said apparatus,
    a pair of inclined transport bars passing through said processing stations and extending from a first side to a second side of said apparatus, and
    holding means for securing said workpiece on said transport bars, wherein each of said processing stations comprises;
        a processing station frame with oppositely positioned first and second ends along said longitudinal axis;
        transport means for moving said workpiece from approximately said first end to approximately said second end of said processing station frame and slideably supporting said transport bars;
        control means for controlling any lateral movements of said transport bars, said control means being adjacent to and cooperating with said transport means; and
        a plurality of inclined guiding bars extending through said transport means and from said first end to said second end of said processing station frame, whereby said transport means, said transport bars and said workpiece substantially continuously rise as they move from approximately said first end to approximately said second end of said processing station frame; and
    said apparatus further comprising leaf springs located at said second side and secured to said transport means, wherein said leaf springs guide said transport bars longitudinally and latitudinally through said apparatus.

* * * * *